(12) United States Patent
Patel et al.

(10) Patent No.: US 8,528,661 B2
(45) Date of Patent: Sep. 10, 2013

(54) DRILL BIT WITH ELECTRICAL POWER GENERATION DEVICES

(75) Inventors: Suresh G. Patel, The Woodlands, TX (US); Clifton N. B. Triplett, Spring, TX (US)

(73) Assignee: Baker Hughes Incorporated, Houston, TX (US)

( * ) Notice: Subject to any disclaimer, the term of this patent is extended or adjusted under 35 U.S.C. 154(b) by 309 days.

(21) Appl. No.: 12/912,962

(22) Filed: Oct. 27, 2010

(65) Prior Publication Data

US 2012/0103690 A1     May 3, 2012

(51) Int. Cl.
*E21B 47/00*     (2012.01)

(52) U.S. Cl.
USPC ............... 175/40; 175/57; 175/382; 175/385

(58) Field of Classification Search
USPC .............................. 175/40, 57, 381, 382, 385
See application file for complete search history.

(56) References Cited

U.S. PATENT DOCUMENTS

| | | | |
|---|---|---|---|
| 4,491,738 A | 1/1985 | Kamp | |
| 5,965,964 A * | 10/1999 | Skinner et al. | 310/15 |
| 6,191,561 B1 | 2/2001 | Bartel | |
| 7,190,084 B2 | 3/2007 | Hall et al. | |
| 7,242,103 B2 | 7/2007 | Tips | |
| 7,337,858 B2 * | 3/2008 | Hall et al. | 175/40 |
| 2009/0133929 A1 | 5/2009 | Rodland | |

* cited by examiner

*Primary Examiner* — William P Neuder
(74) *Attorney, Agent, or Firm* — Cantor Colburn LLP (57) ABSTRACT

A drill bit made according to one embodiment includes a first member including one of a magnet and a coil, and a second member that moves relative to the first member, the second member including the other of the magnet and the coil, wherein the relative motion causes the generation of an electrical charge in the coil.

21 Claims, 6 Drawing Sheets

DRILL BIT WITH ELECTRICAL POWER GENERATION DEVICES

BACKGROUND

1. Field of the Disclosure

This disclosure relates generally to drill bits that include devices for generating electrical energy when the drill bit is in use.

2. Brief Description of the Related Art

Oil wells (wellbores or boreholes) are usually drilled with a drill string that includes a tubular member having a drilling assembly (also referred to as the bottomhole assembly or "BHA") with a drill bit attached to the bottom end thereof. The drill bit is rotated to disintegrate the earth formations to drill the wellbore. The BHA includes devices and sensors for providing information about a variety of parameters relating to the drilling operations and the formation. More recently, sensors and electronic circuits have been placed in the drill bit to provide information of the drill bit, drilling operations and the formation being drilled. Such sensors and electronic circuits require electrical power. It is often difficult to supply electrical energy (also referred to herein as electrical power) to such sensors and circuits from the BHA because of the presence of a mechanical connection between the drill bit pin section and the BHA. Therefore, batteries are often used in the drill bit to provide electrical energy to such sensors and circuits, which power is often limited due to the size and capacity of the batteries.

The disclosure herein provides a drill bit that includes devices configured to generate electrical power when the drill bit is in operation and utilizing the generated electrical energy in a variety of manners.

SUMMARY

A drill bit made according to one embodiment includes a first member including one of a magnet and a coil, and a second member rotatable relative to the first member, the second member including the one of the other of the magnet and the coil. Further, a rotation of the drill bit during drilling causes the first member and the second member to rotate relative each other, thereby generating an electrical charge in the coil. In one aspect, the rotating member and the non-rotating member are associated with or are a part of a drill bit or another downhole device.

In another aspect, a method of making a drill bit made according to one aspect of the disclosure includes: providing a first member with one of a magnet and a coil; and providing a second member that is rotatable relative to the first member; and placing the one of the other of the magnet and the coil in the second member, wherein the rotation of the drill bit during drilling causes the first member and the second member to rotate relative each other, thereby generating an electrical charge in the coil. The electrical energy generated may be utilized for any suitable purpose, including, but not limited to: charge an energy storage device, such as a battery or charge capacitor; power a sensor; supply electrical energy to a device located in the downhole tool, including, but not limited to, junk mills, components of a rotary steering tool, and electrical circuits; determine a characteristic of a component or device downhole.

Examples of certain features of the apparatus and method disclosed herein are summarized rather broadly in order that the detailed description thereof that follows may be better understood. There are, of course, additional features of the apparatus and method disclosed hereinafter that will form the subject of the claims appended hereto.

BRIEF DESCRIPTION OF THE DRAWINGS

For detailed understanding of the present disclosure, references should be made to the following detailed description, taken in conjunction with the accompanying drawings in which like elements have generally been designated with like numerals and wherein.

DETAILED DESCRIPTION

Figure 1:
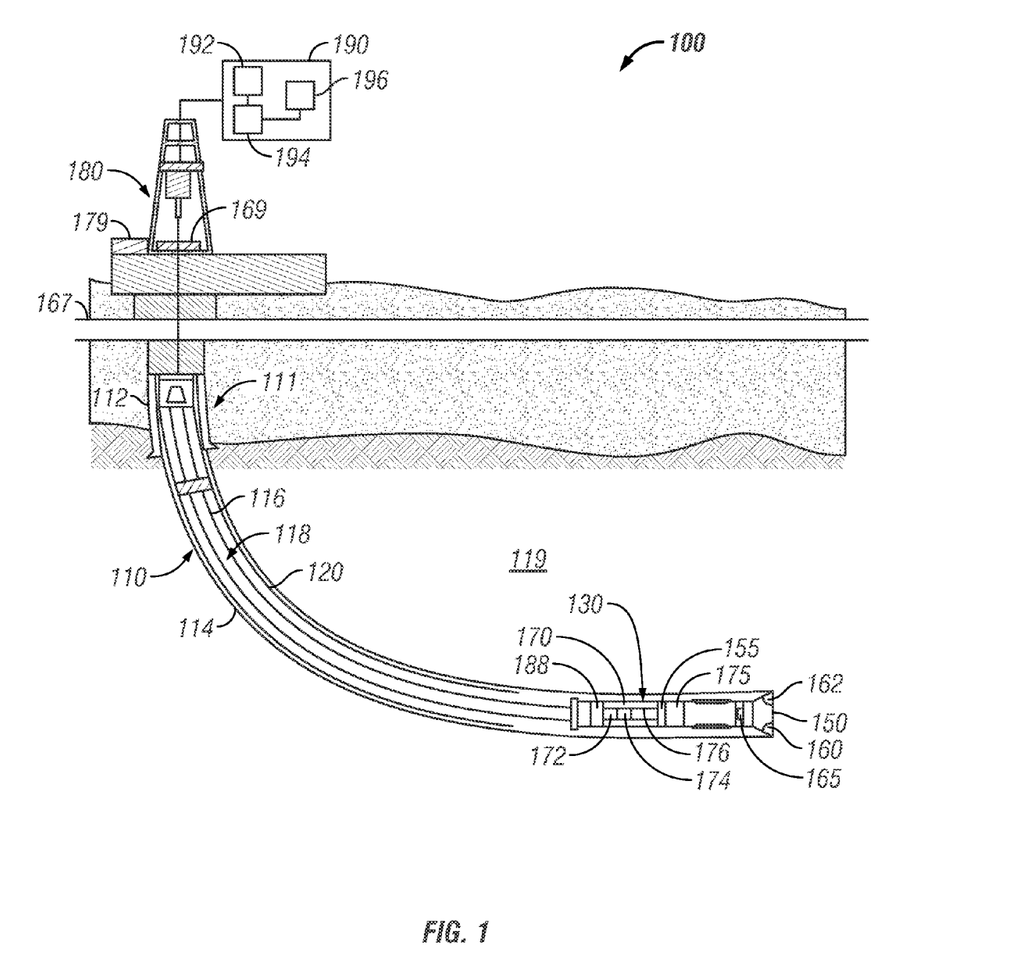
FIG. 1 is a schematic diagram of an exemplary drilling system configured to utilize a drill bit made according to one embodiment of the disclosure herein.

FIG. 1 is a schematic diagram of an exemplary drilling system 100 that may utilize drill bits disclosed herein for drilling wellbores. FIG. 1 shows a wellbore 110 that includes an upper section 111 with a casing 112 installed therein and a lower section 114 being drilled with a drill string 118. The drill string 118 includes a tubular member 116 that carries a drilling assembly 130 (also referred to as the bottomhole assembly or "BHA") at its bottom end. The tubular member 116 may be made up by joining drill pipe sections or a coiled-tubing. A drill bit 150, made according to the disclosure herein, is attached to the bottom end of the BHA 130 for disintegrating the rock formation to drill the wellbore 110 of a selected diameter in the formation 119. The terms wellbore and borehole are used herein as synonyms.

The drill string 118 is shown conveyed into the wellbore 110 from a rig 180 at the surface 167. The exemplary rig 180 shown in FIG. 1 is a land rig for ease of explanation. The apparatus and methods disclosed herein may also be utilized with offshore rigs. A rotary table 169 or a top drive (not shown) coupled to the drill string 118 may be utilized to rotate the drill string 118 at the surface to rotate the drilling assembly 130 and thus the drill bit 150 to drill the wellbore 110. A drilling motor 155 (also referred to as "mud motor") may also be provided to rotate the drill bit. A control unit (or controller or surface controller) 190, which may be a computer-based unit, may be placed at the surface 167 for receiving and processing data transmitted by the sensors in the drill bit and other sensors in the drilling assembly 130 and for controlling selected operations of the various devices and sensors in the drilling assembly 130. The surface controller 190, in one embodiment, may include a processor 192, a data storage device (or a computer-readable medium) 194 for storing data and computer programs 196. The data storage device 194 may be any suitable device, including, but not limited to, a read-only memory (ROM), a random-access memory (RAM), a flash memory, a magnetic tape, a hard disc and an optical disk. To drill wellbore 110, a drilling fluid 179 is pumped under pressure into the tubular member 116. The drilling fluid discharges at the bottom of the drill bit 150 and returns to the surface via the annular space (also referred as the "annulus") between the drill string 118 and the inside wall of the wellbore 110.

Still referring to FIG. 1, the drill bit 150 includes one or more electrical energy generating devices 160 and may further include one or more sensors 162 and electrical circuits 165 for processing signals from such sensors. The various exemplary embodiments of the electrical energy generating devices and various uses of the electrical energy generated by such devices are described in reference to FIGS. 3-6. The drilling assembly 130 may further include one or more downhole sensors (also referred to as the measurement-while-drilling (MWD) or logging-while-drilling (LWD) sensors, collectively designated by numeral 175, and at least one control unit (or controller) 170 for processing data received from the MWD sensors 175 and the drill bit 150. The controller 170 may include a processor 172, such as a microprocessor, a data storage device 174 and a program 176 for use by the processor to process downhole data and to communicate data with the surface controller 190 via a two-way telemetry unit 188. The data storage device may be any suitable memory device, including, but not limited to, a read-only memory (ROM), random access memory (RAM), flash memory and disk.

Figure 2:
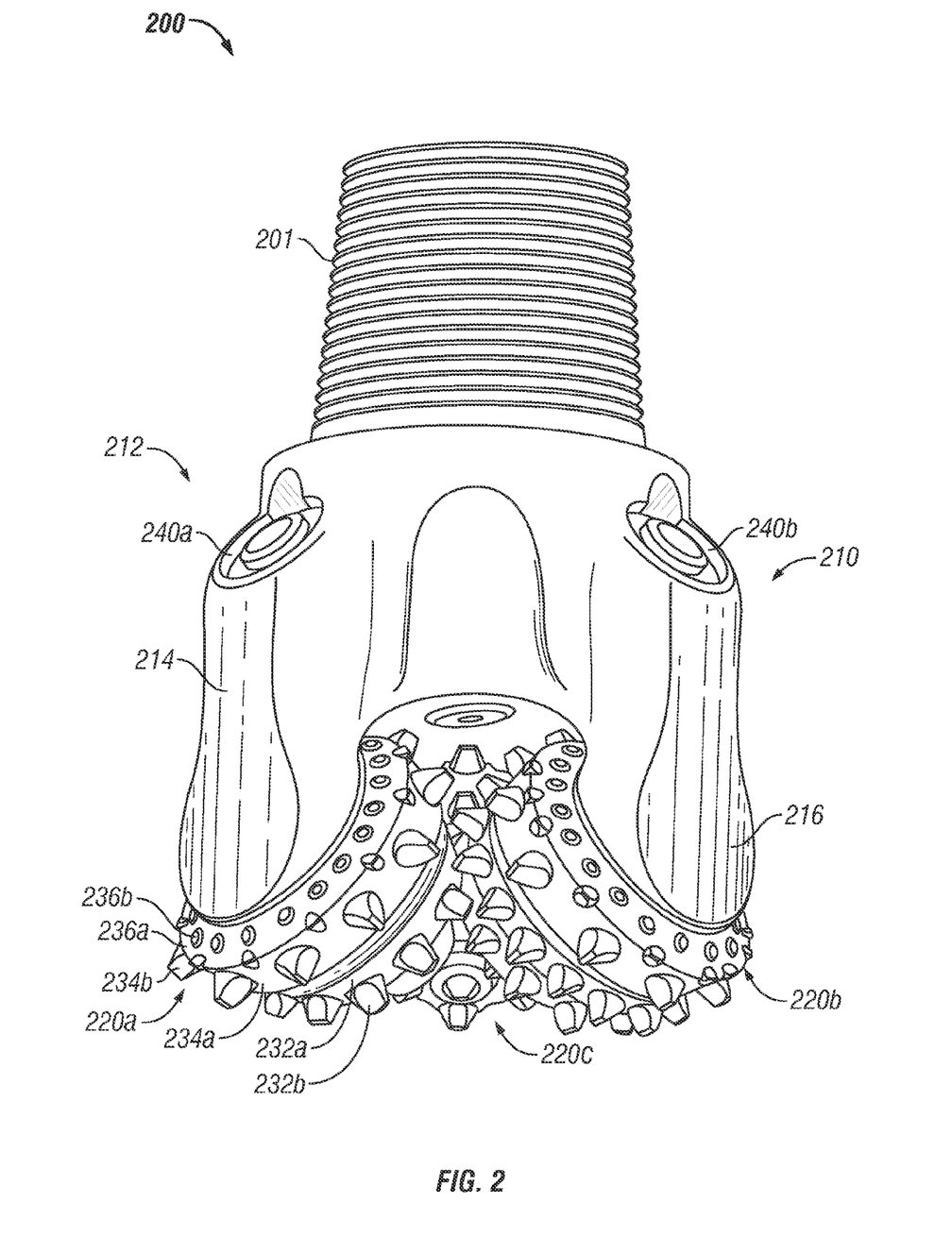
FIG. 2 is an isometric view of an exemplary drill bit incorporating one or more devices configured to generate electrical power downhole according to one exemplary embodiment of the disclosure.

FIG. 2 is a perspective view of an exemplary drill bit 200 incorporating one or more devices configured to generate electrical power or energy downhole, according to one or more exemplary embodiments of the disclosure. The exemplary drill bit 200 is a tricone bit that includes a bit body 210 and roller cones (or cones) 220a, 220b and 220c. The bit body 210 includes pin section 201a for connecting the drill bit to a box section of the BHA, a head section 212 and a separate leg 214 for supporting each of the roller cones 220a-220c. Each roller cone 220a-220c is substantially circular and includes one or more cutting surfaces, each such cutting surface containing a number of cutters or cutting elements for disintegrating the earth formation during drilling of a wellbore. For example, roller cone 220a is shown to include three cutting surfaces, a first cutting surface 232a containing cutters 232b around the cutting surface 232a, cutting surface 234a containing cutters 234b and cutting surface 236a containing cutters 236b. Each roller cone is provided with pressure compensation via a separate port. For example, FIG. 2 shows a port 240a for roller cone 220a and port 240b for roller cone 220b. The port for the cutting cone 220c is obscured. When the drill bit 220 is rotated to drill a wellbore, each roller cone 220a-220c rotates relative to the bit body 210. The relative rotation of the roller cones depends upon the drill bit rotation speed, weight on the bit, rate of penetration and other drilling parameters. The placement and use of the electrical generation devices in the drill bit 200 are described in reference to FIGS. 3-6.

Figure 3:
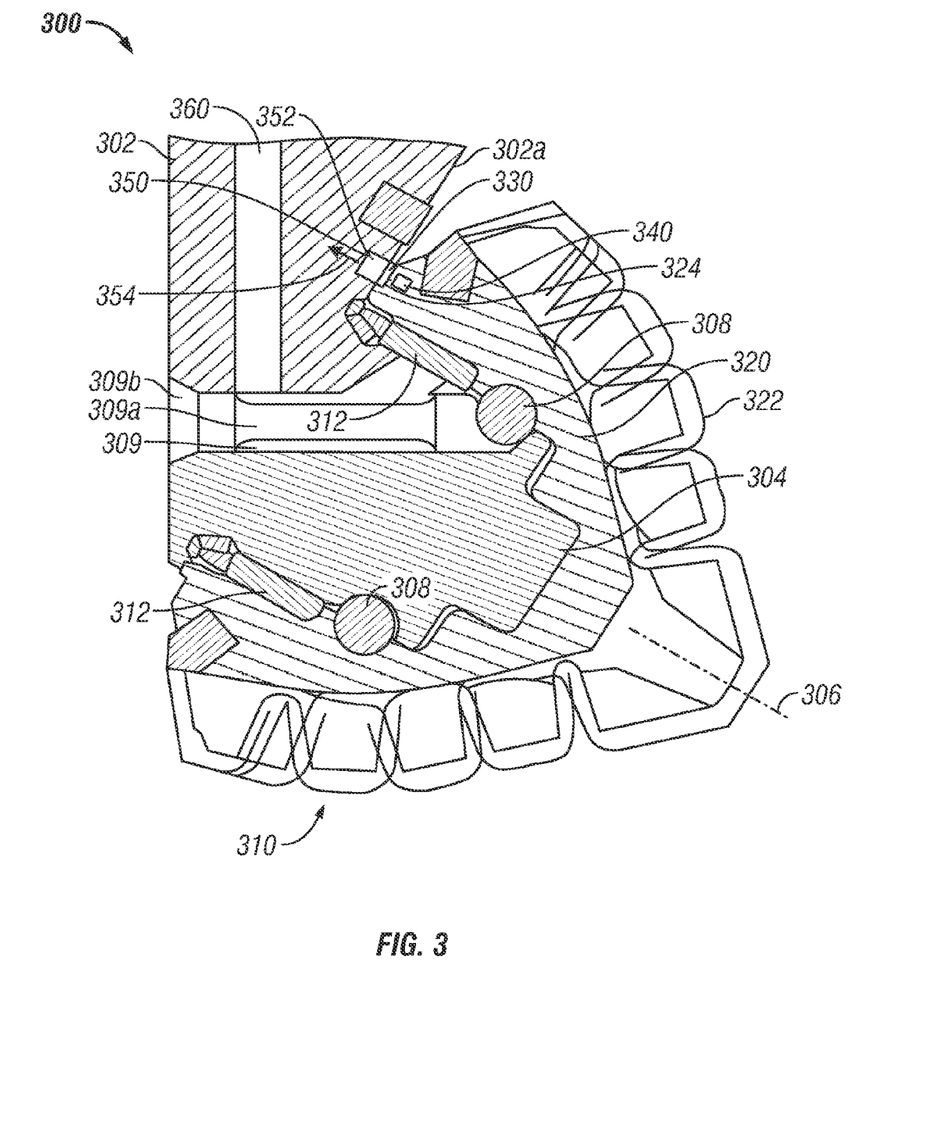
FIG. 3 is a cross-section view of a roller cone of the drill bit of FIG. 2 showing the placement of permanent magnets and a coil configured to generate electrical power when the roller cone rotates relative to the drill bit body during drilling of a wellbore, according to one embodiment of the disclosure.

FIG. 3 is a cross-section view of a section 300 of the drill bit of FIG. 2 showing the placement and use of an exemplary device configured to generate electrical power when the drill bit 200 rotates during drilling of a wellbore. The bit section 300 includes a roller cone 310 that rotates about a bearing shaft 304 having a central axis 306 in the body 302. The bearing shaft 304 is fixed in the body 302 and is supported by bearings 312. The roller cone 310 rotates about the central axis 306 and about ball bearings 308. Each ball bearing 308 may be placed in the body 302 via a cavity 309. Once the ball bearing 308 is placed in the body, a member 309a, such as a steel tube, may be placed in the cavity 309 to secure the bearing 308 in the body 302. A cap 309b may be securely placed behind the member 309a to maintain the bearing 308 in the body 302. A suitable device (not shown) may be utilized to provide pressure compensation to the bearings 308 via passage 360. Such pressure compensation devices are known in the art and thus not described in detail herein. The roller cone 310 is shown to include a body 320 that has cutters 322 around the periphery thereof. The roller cone body 320 rotates relative to the bit body 302 when the drill bit 200 is drilling a wellbore. A gap 330 between an inner surface of the roller cone body 320 and a surface 302a of the body 302 enables the roller cone body 320 to rotate about the central axis 306. The gap 330 is typically relatively small. In the configuration shown in FIG. 3, the inner surface 324 of the roller cone body 320 provides a continuous circular surface that rotates adjacent to the fixed surface 302a of the bit body 302.

FIG. 3 shows an exemplary electrical energy generating device, which device, in one configuration, includes one or more permanent magnets 340 along the inner surface 324 of the roller cone 320. The magnets 340 rotate as the roller cone 320 rotates relative to the surface 302a. Therefore, in the exemplary configuration of FIG. 3, the magnets 340 rotate relative to the surface 302a when the drill bit is rotated to drill a wellbore. To generate electrical power due to the rotation of the magnets 340 in the roller cone 320 relative to the surface 302, one or more coils or pick-up coils 350 may be placed in the body 302 proximate the surface 302a. In one aspect, the coils 350 may be embedded in the body 302 and protected from the drilling fluid and disintegrated rock by a suitable protective surface 352. When the magnets 340 pass in front of the coils 350, an electrical current is induced in the coils due to the change in electromagnetic fields (EMF). Conductors 354 coupled to the coils 350 carry or direct the generated electrical power to a suitable location, as described in more detail in reference to FIG. 6. Thus, in the drill bit 200 of FIG. 2, the rotational energy of a member (such as the roller cone) is utilized to generate electrical energy in the drill bit.

Figure 4:
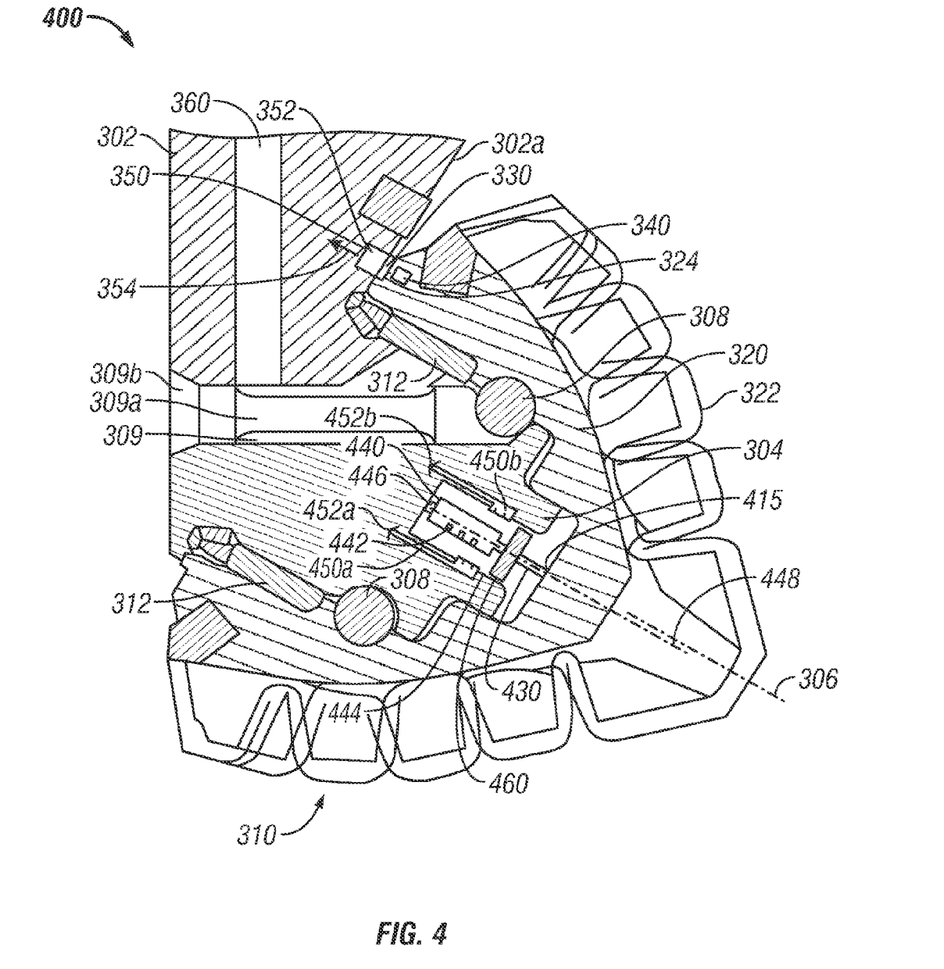
FIG. 4 is a cross-section view of a view of a roller cone of the drill bit of FIG. 2 showing the placement of permanent magnets and a coil configured to generate electrical power when the roller cone rotates relative to the drill bit body during drilling of a wellbore, according to another embodiment of the disclosure.

FIG. 4 is a cross-section view of a roller cone section 400 of the drill bit of FIG. 2 showing the placement of an electrical generation device 410, according to another embodiment of the disclosure. The components of the roller cone section 400 are the same as shown in FIG. 3. The device 410, in one aspect, may include a spindle member 420 attached to or coupled to the roller cone body 322. In one aspect, the spindle section may be offset from the center line 306 to allow the rotation of the roller cone 320 about the pivot point 415 along the center line 302. In this configuration, the spindle member 430 rotates at the same rate as the roller cone 320. A magnet section 440 including one or more magnets 442, may be coupled to the spindle member 430. The magnets 442 are offset from the centerline 448 of the magnet section 440. The magnet section 440 is shown disposed inside a cavity 444 in the bit body 302. In one aspect, the magnet section 440 may include a protrusion 446 that is placed inside conforming end in the cavity to provide lateral stability to the magnet section 440 and also to allow for the free rotation of the magnet section 440 inside the cavity 444. Any other mechanism may be utilized to cause the magnet section 440 to rotate inside the cavity 444. One or more coils, such as coils 450a and 450b, are disposed in the bit body 302 proximate the magnets 442. When the roller cone 320 rotates, the spindle section 430 rotates at the same rotational speed, causing the magnets 442 to pass across the coils 450a and 450b, thereby generating electrical charge in the coils. Conductors 452a and 450b respectively transport the generated electrical charge to suitable locations, as described in more detail with reference to FIG. 6. In aspects, a gear mechanism 460 may be coupled between the roller cone body 322 and the magnet section 440 to provide a desired ratio of rotation between the roller cone body 322 and the magnet section 440. The configuration shown in FIG. 4 provides rotating magnets and fixed coils. Alternatively, the device 410 may include one or more rotating coils and one or more stationary magnets relative to the coils.

Figure 5:
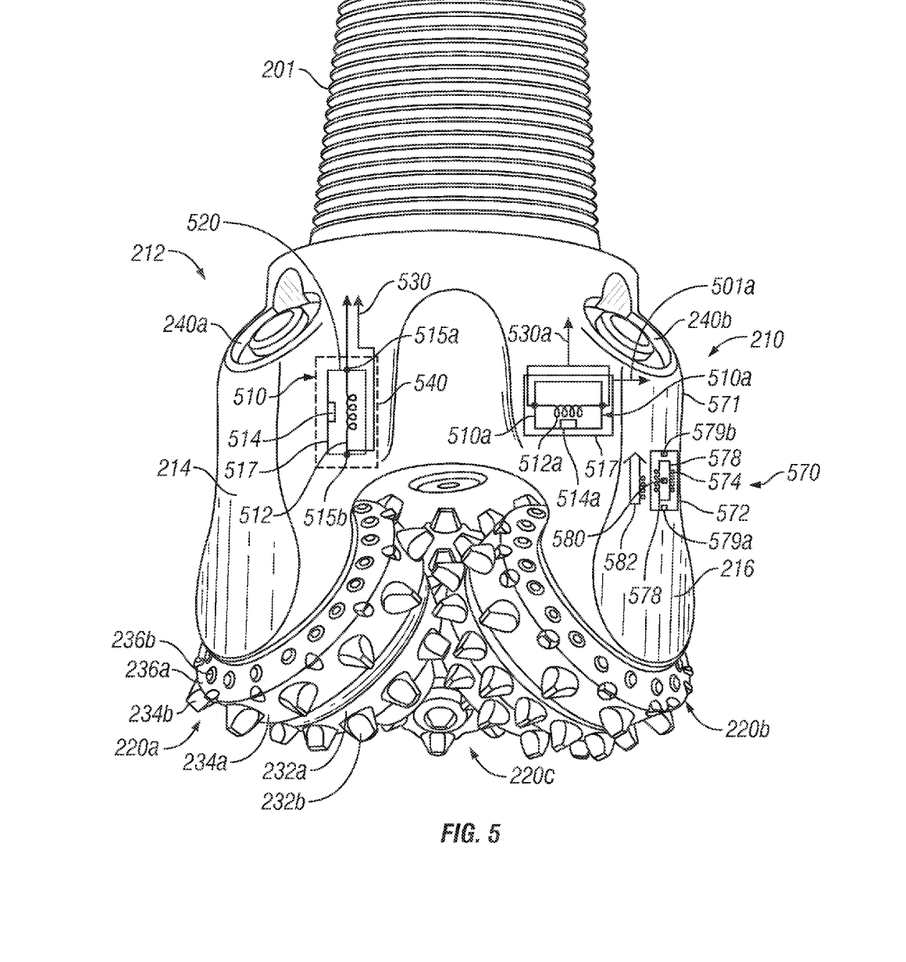
FIG. 5 is a schematic diagrams of a drill bit that includes one or more electric energy generation devices, each such electric energy generation device including a moving or vibrating coil relative to one or more magnets configured to produce electrical charge in the coil due to vibrations present in the drill bit when the drill bit is rotating in the wellbore for drilling the wellbore.
Figure 5A:
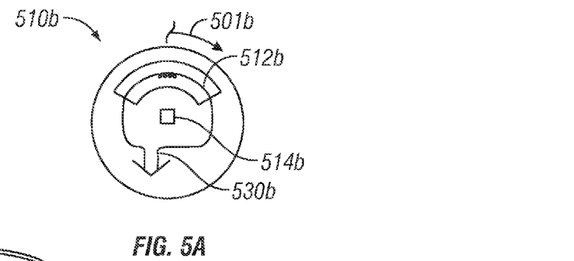
FIG. 5A shows the placement of the electrical energy generation device shown in FIG. 5 along a rotational axis.

FIGS. 5 and 5A are schematic diagrams of a drill bit shown in FIG. 2 that include one or more devices for generating electrical energy according to yet another embodiment of the disclosure. FIG. 5 is shown to include an electrical energy generating device 510 that includes a coil 512 proximate a magnet 514. In one aspect, the coil 512 may be suspended at a pair of ends 515a and 515b in an enclosure 520. The magnet 514 may be placed in or affixed to an inside 517 of the enclosure 520. The device 510 may be made as an assembled module and placed inside a cavity 540 in the drill bit body. The device 510 is shown positioned along an axial direction, i.e., along the axial direction 501 of the drill bit 200. In this particular configuration, the coil 512 moves axially when the drill bit vibrates during a drilling operation. The motion of the coil 512 proximate the magnet 514 generates electrical energy, which may be transported via conductors 530 to a suitable location in the bit or to the BHA (FIG. 1), as described in more detail in reference to FIG. 6. In some applications, it may be desired to utilize additional electrical energy generating devices, such as along a radial direction and along a rotational direction. FIG. 5 shows an electrical energy generating device 510a placed along a radial direction, i.e. along a direction substantially perpendicular to the axial direction 501. In this configuration, the coil 512a moves along the radial direction proximate the magnet 514a. The generated electrical energy may be transported via suitable conductors 530a to a selected location, as described in more detail in reference to FIG. 6. FIG. 5A shows the placement of an electrical energy generating device 510b along a rotational direction. In this configuration, the coil 512b moves along a radial direction 501b proximate the magnet 514b. The electrical energy generated by the device 510b may be transported by conductors 530b to a suitable location. In any of the devices 510, 510a and 510b, the coil may be fixed and the magnet a moving element. Also, more than one coil and/or magnet may be utilized.

FIG. 5 further shows another embodiment of an electrical energy generation device 570. The device 570, in one embodiment, includes a rotatable member 574 placed in a recess or pocket 576 made along a side 571 of the drill bit body 210. The rotatable member 574 includes protrusions 578 configured to contact inside wall of the wellbore during drilling of the wellbore. When the dill bit 200 rotates, the protrusions 578 contact the wellbore wall, thereby causing the rotatable member 574 to rotate about pivot points 579a and 579b inside the pocket 576. A magnet 580 may be placed on the rotatable member 574, offset from the centerline passing through the pivot points 579a and 579b. A coil 582 may be placed in the drill bit body proximate the rotatable member 574. When the rotatable member 574 rotates, the magnet 580 passes across the coil 582, generating electrical charge in the coil 582. Conductors 582 carry the generated electrical energy to a suitable location.

In view of the above description, it should be recognized that the apparatus and methods described herein generate electrical energy by: relative motion between the magnets and coils (including back and forth motion between a magnet moving past a pick-up coil); and vibration causing a relative motion between the magnets and coils.

Figure 6:
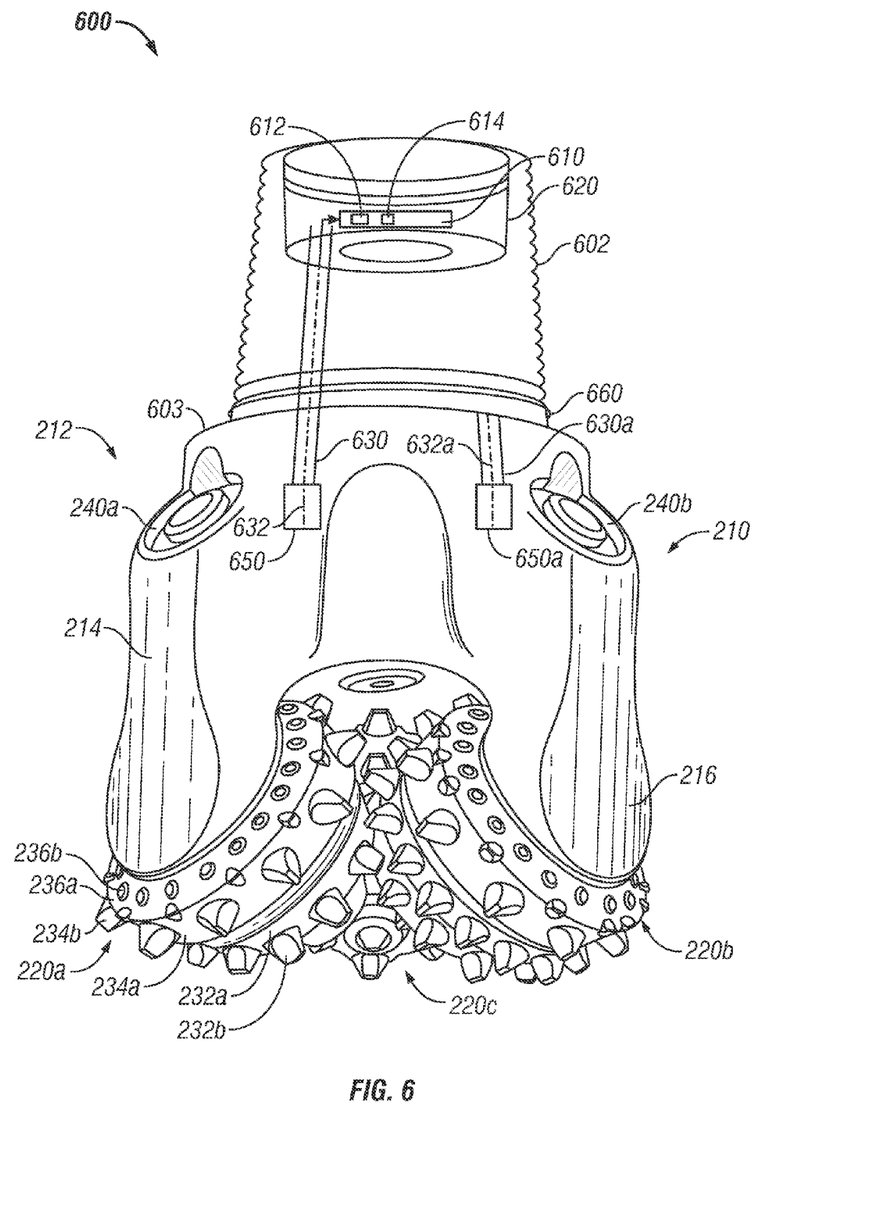
FIG. 6 shows the drill bit with exemplary electrical paths for transporting the generated electrical energy to various locations.

FIG. 6 shows the drill bit 600 with exemplary electrical paths for transporting the generated electrical energy by the electrical generating devices in the drill bit 600, such as described in reference to FIGS. 3-5, to one or more selected locations. The drill bit 600 is shown to contain an electrical circuit 610 in a recess 620 in the pin connection section (also referred to as the neck) 602 of the drill bit 600. The circuit 610 may be utilized to process signals received from one or more sensors (not shown) in the drill bit. In one aspect, a conduit 630 may be formed in the drill bit body 210 from proximate the electrical generation device 650 to the recess 620. The conductors 632, carrying the electrical energy generated by the device 650, may be run inside a conduit 630 formed from the device 650 to the electrical circuit recess 620. In another aspect, an electrical coupling 660, such as a conductive slip ring, may be placed around a lower end 603 of the pin connection 602. The conductors 632a run inside a conduit 630a and carry the generated electrical energy from the device 650a to the coupling 660. In practice, a box connection (not shown) at the end of the BHA is connected to the pin connection 602. The lower end of such a box connection rests on the recess 603. An electrical coupling, similar to the coupling 660, is placed at the bottom end of the box connection, so that when the box connection mates with the recess 603, the electrical coupling in the box connection couples with the electrical coupling 660. In this manner electrical energy from the device 650a may be transported to the BHA. In other aspects, the electrical energy generated in the drill bit may be supplied to charge a battery 612 that supplies electrical power to the electrical circuit 610 and/or to a charge storage device 614 in the drill bit, such as a charge capacitor. The generated electrical energy may also be utilized to power sensors or other utility devices located within the downhole tool. Further, any other use of the generated electrical energy downhole by the methods described herein is considered within the scope of this disclosure. Additionally, described herein may be utilized to generate electrical energy in various other downhole devices, including, but not limited to, junk mills, rotary steering tools, drill pipe, stabilizers.

In addition, the electrical energy generated may be utilized to determine one or more downhole parameters or characteristics. For example, each roller cone of a roller cone bit typically rotates at the same speed during drilling. Therefore, the electrical energy produced by substantially identical electrical energy generation devices will be approximately the same. In one aspect, the electrical energy produced at each roller cone may be compared by the circuit 610 or another suitable circuit in the BHA. If the electrical energy produced by a particular device is different (more or less) compared to the electrical energy produced by another device, the difference may be utilized to infer that a particular roller cone may be malfunctioning or that the coil or magnets associated with such a device are not operating as desired. In another aspect, the amount of electrical energy generated by any device may be calibrated at the surface corresponding to one or more selected characteristics or parameters, such relative rotational speed (for example rpm) of the magnets and the coil, vibration of the bit along one or more axles (axial, radial and torsional). The amount of electrical energy produced by a particular device downhole may provide an indication of a characteristic of the drill bit, such as a sticking of a cone, excessive vibration of the drill bit, etc.

Although a tricone drill bit is used herein to describe the concepts and various exemplary embodiments of the electrical energy generating device, such concepts and the electrical energy generating devices described herein are equally applicable to any drill bit that includes at least one member that rotates relative to another member. Such drill bits, for example, may be hybrid drill bits that include one or more roller cones and a fixed cutter or a reamer bit wherein one or more cutting members rotates relative to a fixed member or a drill bit that includes a combination of aspects of such drill bits. Similarly, the electrical generating devices described herein may also be utilized in any downhole tool or apparatus that includes a rotating member relative to another member, such as shaft inside a tool body in a BHA.

The foregoing description is directed to certain embodiments for the purpose of illustration and explanation. It will be apparent, however, to persons skilled in the art that many modifications and changes to the embodiments set forth above may be made without departing from the scope and spirit of the concepts and embodiments disclosed herein. It is intended that the following claims be interpreted to embrace all such modifications and changes.

The invention claimed is:

1. A drill bit comprising:
 a body including one of a magnet and a coil; and
 a roller cone having cutting elements, the roller cone supported by a leg of the body and rotatable relative to the body, the roller cone coupled to the other of the magnet and the coil,
 wherein rotation of the roller cone drill bit during drilling causes the body and the roller cone to rotate relative each other, thereby generating an electrical charge in the coil.

2. The drill bit of claim 1, wherein the roller cone includes the magnet and the coil is at a surface of the body of the roller cone drill bit.

3. The drill bit of claim 1, wherein the body includes a first member that carries one of the coil and the magnet and a second member that includes the other of the coil and the magnet, wherein the second member is coupled to the roller cone and rotation of the roller cone relative the body causes the second member to rotate in the bit body.

4. The drill bit of claim 3 further comprising a gear device that defines the rotation of the second member relative to the roller cone.

5. A roller cone drill bit comprising:
 an electrical energy generation device placed in a body of the roller cone drill bit, wherein the electrical energy generation device includes a coil and a magnet, wherein one of the coil and the magnet is configured to move relative to the other of the coil and the magnet when a roller cone of the drill bit supported by a leg of the body and having a plurality of cutting elements is rotated relative the body to drill a wellbore.

6. The drill bit of claim 5, wherein the coil is suspended in a space in the bit body and the magnet is stationary inside the bit body proximate the coil.

7. The drill bit of claim 5, wherein the electrical energy generation device is a module placed in a cavity in the bit body.

8. A drill bit comprising:
 a rotatable member placed along a surface of a bit body, wherein the rotatable member includes a magnet that is configured to rotate when the rotatable member comes in contact with a wall of a wellbore when the drill bit is rotated in a wellbore; and
 a coil in the bit body proximate the magnet, wherein rotation of the magnet induces an electrical charge in the coil.

9. The drill bit of claim 8, wherein the rotatable member is further configured to act as a stabilizer for the drill bit.

10. The drill bit of claim 8, wherein the rotatable member includes an uneven surface configured to contact the wall of the wellbore.

11. The drill bit of claim 8, wherein the induced electrical charge is used as one of: to charge a battery in the drill bit; to charge an energy storage device; to provide electrical energy to a component in a bottomhole assembly; and to provide electrical energy to one or more sensors in the drill bit.

12. A method of making a roller cone drill bit, comprising:
 providing a body of the roller cone drill bit having one of a magnet and a coil; and
 providing a roller cone configured to be supported by a leg of the body and to rotate relative to the body;
 coupling the other of the magnet and the coil to the roller cone, wherein rotation of the drill bit during drilling causes the body and the roller cone to rotate relative to each other, thereby generating an electrical charge in the coil.

13. The method of claim 12, wherein the roller cone includes the magnet and the body includes the coil.

14. The method of claim 12, wherein the bit body includes the coil and the roller cone is coupled to the magnet, and rotation of the roller cone relative to the bit body causes the magnet to rotate in the bit body.

15. The method of claim 14 further comprising providing a gear device between the first and the second members configured to define the rotation of the second member relative to the roller cone.

16. A method of making a roller cone drill bit comprising:
 placing an electrical energy generation device in a bit body of the roller cone drill bit, wherein the electrical energy generation device includes a coil and a magnet, wherein one of the coil and the magnet is configured to move relative to the other of the coil and the magnet when a roller cone of the drill bit having a plurality of cutting elements and supported by a leg of the bit body is used for drilling a wellbore.

17. The method of claim 16, wherein the coil is suspended in a space in the bit body and the magnet is stationary inside the bit body proximate the coil.

18. The method of claim 16, wherein the electrical energy generation device is a module placed in a cavity in the bit body.

19. A method of drilling a well, comprising:
 conveying a drill string in the wellbore, the drill string including a roller cone drill bit at an end thereof, wherein the roller cone drill bit includes a body including one of a magnet and a coil and a roller cone having a plurality of cutting elements and supported by a leg of the body and rotatable relative to the body, the roller cone including the other of the magnet and the coil, wherein rotation of the roller cone drill bit during drilling causes the body and the roller cone to rotate relative each other, thereby generating an electrical charge in the coil;
 drilling the wellbore by rotating the drill bit to generate the electrical charge in the drill bit; and utilizing the generated charge downhole to perform a selected function.

20. The method of claim 19, wherein the roller cone is further configured to be one of: a stabilizer for the drill bit and a cutting member.

21. An apparatus for use downhole, comprising:
a body of a roller cone drill bit including one of a magnet and a coil; and
a roller cone of the roller cone drill bit that is supported by a leg of the body and moves relative to the body, the roller cone including the other of the magnet and the coil when the apparatus is in use downhole, wherein
the relative motion between the body and the roller cone generates an electrical charge in the coil.

\* \* \* \* \*